Z. ISRAEL.
AUTOMOBILE OR TRUCK FENDER.
APPLICATION FILED SEPT. 17, 1921.

1,431,117.  Patented Oct. 3, 1922.

INVENTOR
Z. Israel

Patented Oct. 3, 1922.

1,431,117

UNITED STATES PATENT OFFICE.

ZISU ISRAEL, OF WINNIPEG, MANITOBA, CANADA.

AUTOMOBILE OR TRUCK FENDER.

Application filed September 17, 1921. Serial No. 501,408.

*To all whom it may concern:*

Be it known that I, ZISU ISRAEL, a subject of the King of Great Britain, of the city of Winnipeg, in the Province of Manitoba, Canada, have invented certain new and useful Improvements in Automobile or Truck Fenders, of which the following is the specification.

The invention relates to improvements in fenders for automobiles, trucks and such like and an object of the invention is to provide a simply constructed, durable and easily applied fender which will effectively guard the front wheels of the truck or automobile and prevent the possibility of persons being run over or passed beneath the car.

A further object of the invention is to construct the fender so that it can be adjusted both in width and height to accommodate the various types of cars in existence.

With the above more important objects in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

Figure 1:
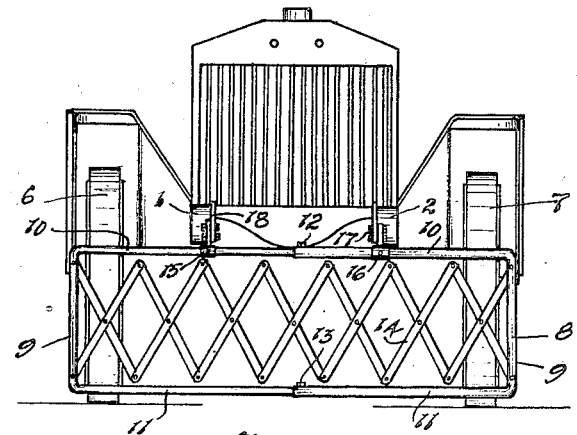
Fig. 1 is a front view of a truck showing the fender thereon.
Figure 2:
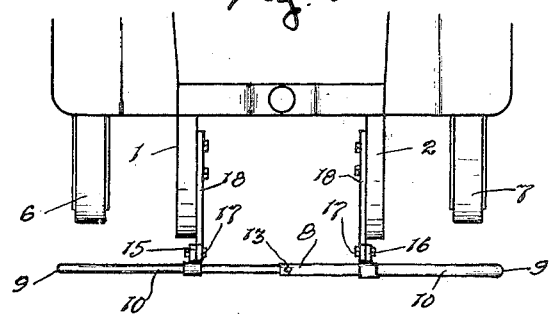
Fig. 2 is a plan view.

I have shown the fender as attached to a truck frame but it will be readily understood that it could be as easily attached to an automobile or pleasure car frame. The side members 1 and 2 of the truck frame are supported in the usual way by the customary semi-elliptical spring 3 from the front axle 4 which in turn is supported by the front steering wheels 6 and 7. The fender 8 which I provide is carried by the forward end of the frame members 1 and 2 and is positioned such that it guards the steering wheels and is close enough to the ground to prevent the passage of children or adults beneath the fender.

The fender comprises a substantially rectangular open centered adjustable sectional frame, each section being formed from an end member 9 and top and bottom members 10 and 11. I prefer the sections to be tubular as they are light and strong and the top and bottom members of the one section are designed so that they will slidably telescope within the top and bottom members of the other section. In this way it is possible to lengthen the frame in order to accommodate different widths of trucks, the ends of the frame extending beyond the wheels.

Once the frame has been adjusted in length it is fastened by set screws 12 and 13 provided. The open centre of the frame is closed preferably by jointed or pivotally connected arms 14 arranged in an X-like formation and having the end pairs of arms pivotally attached to the ends of the frame.

According to this arrangement it will be obvious that the arms will close in and open up depending on the adjustment of the frame. I might here remark that the adjustment is more or less limited so that the arms will always close the frame sufficiently to prevent the escape through of a person.

The fender is suspended adjustably from the front ends of the tractor frame by a pair of similar hangers 15 and 16, each hanger being more or less L-shaped and having the horizontal arm permanently clamped to one of the fender frame sections and the vertical arm adjustably connected by bolts 17 to the T-shaped head of a supporting arm 18 permanently bolted to the fender frame.

In order to attach the fender to the tractor or automobile it is only necessary to drill bolt holes in the tractor or automobile frame in order to attach the supporting arms. Obviously if it is not desired to do this the arms could be clamped or otherwise secured to the frame in any well known manner.

The fender is adjusted in height by adjusting the bolts 17 to allow the hangers to be raised or lowered. By providing this vertical adjustment and the length adjustment of the fender I can accommodate the fender to all types of cars.

I wish to point out that in some cases truck frames terminate in square ends. In such a case the arms would be shorter.

Figures 3, 4:
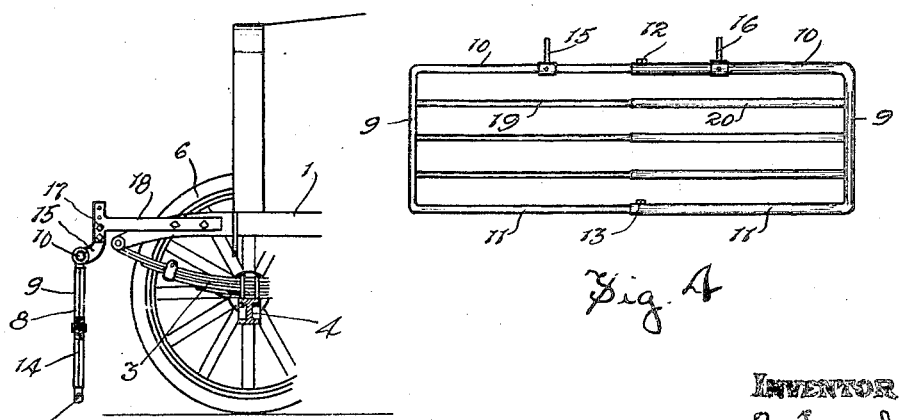
Fig. 3 is a side view of one of the connections between the fender and the truck frame, part being shown in section.
Fig. 4 is a front view of a modified form of fender.

In Figure 4 I have shown a modified type of fender. In this arrangement the crossed pivoted bars are done away with and telescoping pairs of tubes 19 and 20 are provided, the tubes being carried by the end members of the fender sections and pulling in and out in the same manner as do the sections to accommodate an adjustment in length of the fender frame.

What I claim as my invention is:—

1. The combination with the front end of a vehicle frame and the steering wheels thereof, of a fender frame formed from two telescoping sections adapted to open and close for length adjustment, a plurality of crossed pivotally connected and interconnected pairs of bars normally closing the open centre of the frame and having the end pairs of bars pivotally connected to the ends of the frame and means adjustably connecting the fender to the front end of the vehicle frame.

2. An automobile fender comprising a pair of U-shaped frames having the side members thereof telescoping, and adjustable connections extending between the ends of the frame, said connections being free of the side members and forming therewith a barrier of adjustable length.

Signed at Winnipeg this 3rd day of June 1921.

ZISU ISRAEL.

In the presence of—
 G. S. ROXBUYH,
 M. B. KELLEHED.